US012763997B2

(12) United States Patent
Lusted

(10) Patent No.: US 12,763,997 B2
(45) Date of Patent: Oct. 13, 2026

(54) SIGNAL DE-CORRELATION FOR TRAINING MULTI-LANE ETHERNET INTERFACES

(71) Applicant: Intel Corporation, Santa Clara, CA (US)

(72) Inventor: Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 19/099,403

(22) PCT Filed: May 11, 2023

(86) PCT No.: PCT/US2023/021958

§ 371 (c)(1),
(2) Date: Jan. 28, 2025

(87) PCT Pub. No.: WO2024/049517

PCT Pub. Date: Mar. 7, 2024

(65) Prior Publication Data

US 2026/0039516 A1 Feb. 5, 2026

Related U.S. Application Data

(60) Provisional application No. 63/433,647, filed on Dec. 19, 2022, provisional application No. 63/401,938, filed on Aug. 29, 2022.

(51) Int. Cl.
*H04L 25/03* (2006.01)
*H04L 25/49* (2006.01)

(52) U.S. Cl.
CPC .... *H04L 25/03178* (2013.01); *H04L 25/4917* (2013.01)

(58) Field of Classification Search
CPC ................................ H04L 25/03178
USPC ................................ 375/229
See application file for complete search history.

(56) References Cited

U.S. PATENT DOCUMENTS

| | | | | |
|---|---|---|---|---|
| 11,424,968 | B1 | 8/2022 | Sun et al. | |
| 2003/0086515 | A1 | 5/2003 | Trans et al. | |
| 2013/0243011 | A1 | 9/2013 | Ungerboeck et al. | |
| 2014/0254640 | A1* | 9/2014 | Lusted .................. | H04L 5/1438 375/219 |
| 2016/0359754 | A1 | 12/2016 | Gravel et al. | |
| 2020/0076651 | A1 | 3/2020 | Sun et al. | |
| 2020/0259936 | A1 | 8/2020 | Lusted et al. | |
| 2022/0094463 | A1 | 3/2022 | Sun et al. | |

OTHER PUBLICATIONS

IEEE Computer Society, "IEEE Standard for Ethernet", IEEE Std 802.3-2022, Section Eight, Approved May 13, 2022, pp. 5296-5346.
IEEE P802.3cd™M/D2.1, 'IEEE Standard for Ethernet Amendment: Amendment 3: Media Access Control Parameters for 50 Gb/s and Physical Layers and Management Parameters for 50 Gb/s, 100 Gb/s, and 200 Gb/s Operation', Approved Dec. 5, 2018, 401 pages.

(Continued)

*Primary Examiner* — Lihong Yu
(74) *Attorney, Agent, or Firm* — Compass IP Law PC

(57) ABSTRACT

Examples described herein relate to an Ethernet physical layer transceiver (PHY) circuitry to generate a training signal for transmission for a lane based on a pseudorandom bit sequence (PRBS) polynomial and seed.

22 Claims, 9 Drawing Sheets

A set of four PRBS generator polynomials are defined to minimize correlated interference between PMDs, or physical lanes within a PMD, during the startup protocol. The PRBS generator for each lane shall implement each of four generator polynomials defined in Table 136–8. The polynomial used in each lane *i* is selectable by identifier_*i*. The default identifier for each lane is its lane number (e.g., the default value for identifier_0 is 0 which selects polynomial_0). A sample implementation of the PRBS generator for identifier_*i* = 0 is shown in Figure 136–5.

**Figure 136–5—Training pattern PRBS generator (identifier_*i* = 0)**

(56) References Cited

OTHER PUBLICATIONS

International Search Report and Written Opinion for PCT Patent Application No. PCT/US23/21958, Mailed Aug. 21, 2023, 10 pages.
International Search Report and Written Opinion for PCT Patent Application No. PCT/US23/34232, Mailed Jan. 24, 2024, 11 pages.
Kent Lusted et al., 'CI 136.8.11 Link Training Issue (comment #1) Update', Nov. 2020, [retrieved on Aug. 10, 2023]. Retrieved from: slides 2-17.
Extended European Search Report for Patent Application No. 23861025.7, Mailed May 20, 2026, 7 pages.

* cited by examiner

Table 136–8—Training patterns

| $p$ | Polynomial_$p$, $G(x)$ | Default seed bits[a] | Initial output, PAM2 | Initial output, PAM4 | Initial output, PAM4 with precoding |
|---|---|---|---|---|---|
| 0 | $1 + x + x^2 + x^{12} + x^{13}$ | 0000010101011 | 0030330330000 | 1031320220111[b] | 1301200200101 |
| 1 | $1 + x^2 + x^3 + x^7 + x^{13}$ | 0011101000001 | 3030303030333 | 3030213021333 | 3122012201212 |
| 2 | $1 + x^2 + x^4 + x^8 + x^{13}$ | 1001000101100 | 0303333033030 | 1212332133031 | 1102120121301 |
| 3 | $1 + x^2 + x^5 + x^9 + x^{13}$ | 0100010000010 | 3330300030330 | 2231210121221 | 2032013201110 |

[a]The leftmost bit in the sequence corresponds to the initial value of S0 and the rightmost bit corresponds to the initial value of S12.
[b]This is equivalent to the PRBS13Q test pattern defined in 120.5.11.2.1.

FIG. 1

A set of four PRBS generator polynomials are defined to minimize correlated interference between PMDs, or physical lanes within a PMD, during the startup protocol. The PRBS generator for each lane shall implement each of four generator polynomials defined in Table 136–8. The polynomial used in each lane $i$ is selectable by identifier_$i$. The default identifier for each lane is its lane number (e.g., the default value for identifier_0 is 0 which selects polynomial_0). A sample implementation of the PRBS generator for identifier_$i$ = 0 is shown in Figure 136–5.

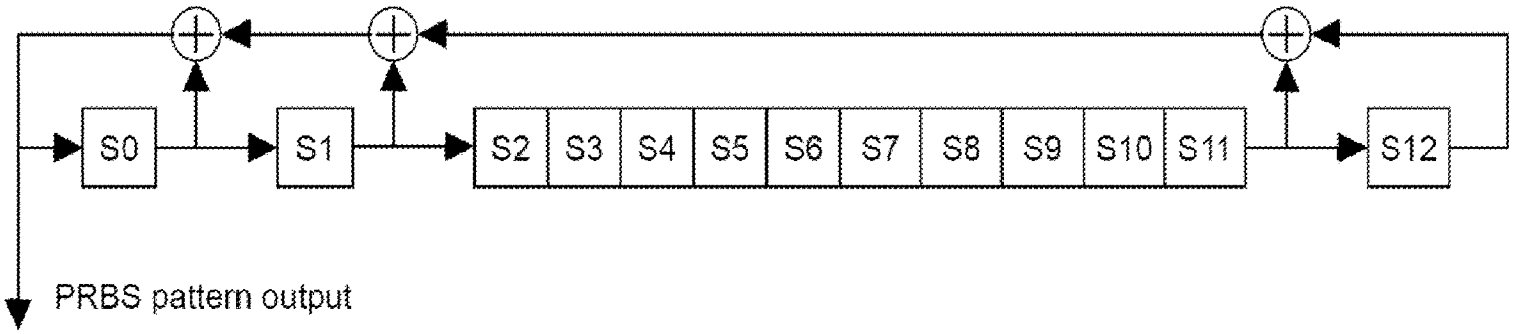

Figure 136–5—Training pattern PRBS generator (identifier_$i$ = 0)

FIG. 2

Figure 136–4—Training pattern generator

SIGNAL DE-CORRELATION FOR TRAINING MULTI-LANE ETHERNET INTERFACES

CLAIM OF PRIORITY

This application is a U.S. National Phase application under 35 U.S.C. § 371 of International Application No. PCT/US23/21958 filed May 11, 2023 which in turn claims the benefit of and priority to U.S. Provisional Application No. 63/433,647 filed Dec. 19, 2022 and U.S. Provisional Application No. 63/401,938 filed Aug. 29, 2022, the entire contents of which are incorporated herein by reference.

RELATED APPLICATIONS

This application claims priority to U.S. Provisional Application No. 63/401,938, filed Aug. 29, 2022 and U.S. Provisional Application No. 63/433,647, filed Dec. 19, 2022. The entire contents of those applications are incorporated by reference in their entirety.

DESCRIPTION

Network-connected devices communicate with each other to determine common communications capabilities and parameters are discovered. Auto-negotiation (AN) is a process whereby end points of a link share information on various capabilities relevant to their communication. For an example of AN, see Clause 73 of Institute of Electrical and Electronics Engineers (IEEE) Standard (Std.) 802.3-2022. Link partner devices exchange abilities and modes of operation via the exchange of base pages and, if requested, the link partner devices exchange next pages. According to Clause 73 of IEEE Std. 802.3-2022, each device sends a list of its data-rate and FEC capabilities to its link partner. Auto-negotiation can determine the highest common capability and the highest common capabilities are used for communication between the link partner devices. After both devices receive their link partner's capability list, the devices can transition to the highest common data rate and feature capabilities.

Link training is a process used by a device connected through a copper cable, backplane, or other wired or wireless signal transmission media by which the transmitter and receiver communicate with each other in order to tune their equalization settings. For example, communications between a transmitter and a receiver at very high data rates tune equalization settings to mitigate frequency dependent signal attenuation. Equalization tuning can be applied at the transmitter (Tx) and/or at the receiver (Rx). For example, devices can tune equalizer settings of serializers/deserializers (SerDes) using link training.

For example, link establishment, link training or link re-training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

BRIEF DESCRIPTION OF THE DRAWINGS

FIG. 1 depicts an example of training patterns.

FIG. 2 depicts an example PRBS generator.

DETAILED DESCRIPTION

Figure 3:
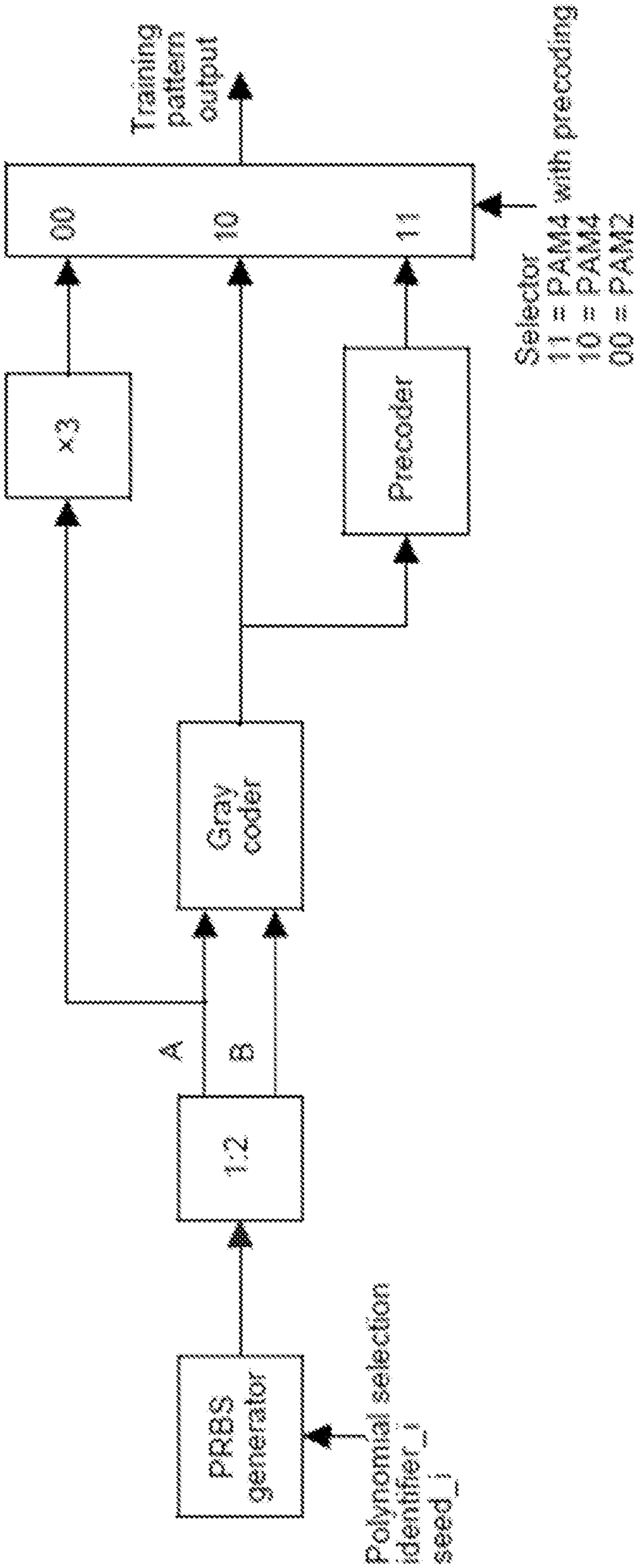
FIG. 3 depicts an example training pattern generator.

The Physical Medium Dependent (PMD) Control Function "Link training" in IEEE Std. 802.3-2022 Cl 136.8.11 is specified for one-lane, two-lane, and four-lane backplane and copper cable interfaces. Link training in IEEE Std. 802.3-2022 Clause 136.8.11 specifies only 4 different pseudorandom binary sequence 13 (PRBS13) polynomials to generate training signals for 50 Gbps/lane and 100 Gbps/lane rates. However, IEEE P802.3df expands the number of Ethernet lanes from four to eight. Eight lanes can be used to transmit 800 Gb Ethernet signals. IEEE P802.3ck 100G/lane PMD specifications can be applied per lane. The number of PRBS13 polynomials defined in IEEE Std. 802.3-2022 Table 136-8 is (4) and is less than the number of supported lanes (8).

FIG. 1 depicts a reproduction of Table 136-8 of IEEE 802.3-2022. Polynomials are applied to generate training signals based on seed values. However, examples can apply to earlier or later versions of 802.3-2022 or variations thereof. A transmitter transmits training signals on lanes to a receiver during training of receiver equalizers and training of transmitter equalizers. If the same patterns are transmitted on multiple lanes, crosstalk and inter-symbol interference (ISI) among lanes can be difficult to isolate, reduce, or eliminate. Reusing polynomials and seeds can lead to challenges in decorrelating crosstalk in a system.

Various examples provide for additional PRBS13 polynomials and/or seeds for use to potentially de-correlate training sequences between lanes. For example, if 4 or fewer lanes are used, polynomials and seeds shown in Table 136-8 can be used. However, if 5 or more lanes are used, various examples of polynomials and/or seeds described herein can be used. In some examples, polynomials in Table 136-8 for lanes 0-3 can be reused for lanes 4-7 but with different default seed bits. Use of different PRBS13 polynomials for lanes 4-7 than utilized for lanes 0-3 provide potential for greater reduction in crosstalk than reusing PRBS polynomials of Table 136-8 and seeds across lanes 4-7 or reusing PRBS polynomials of Table 136-8 and using different seeds for lanes 4-7. Such examples can permit reuse of IEEE P802.3ck consistent Physical Layer implementations with four polynomial generators. In some examples, PRBS13 polynomials and initial seeds are provided that are different from the four PRBS13 polynomials and initial seeds shown in Table 136-8. Accordingly, correlation of crosstalk from individual lanes in an 8-lane Ethernet PHY can be potentially reduced.

Reuse Polynomials of Table 136-8 and Utilize Different Seed Values

FIG. 2 depicts an example PRBS generator for identifier_i=0 (e.g., lane 0), which is a reproduction of FIG. 136-5 of IEEE Std. 802.3-2022. PRBS generator can utilize a default seed value represented by S0-S12. For example, PRBS generators that apply polynomials specified in Table 136-8 can be used for lanes 0-3. Example PRBS generators are not limited to the example of FIG. 2. For lanes 4-7, various examples provide for reuse of polynomials specified in Table 136-8 but with different initial seeds. For example, a 4-lane PMD building block circuitry with four polynomial generators can be reused to generate training patterns for lanes 4-7.

Table 1 below provides an example Training Pattern Details for PMD lanes [4:7], where P represents a lane number. In some examples, Table 136-8 of IEEE 802.3-2022 can be modified to include the examples for lanes 4-7 in Table 1.

in each lane i is selectable by identifier_i. A default identifier for a lane is its lane number. At the start of a training pattern, the state of the PRBS generator can be set to a specified seed value. A default value of seed_i can be given the value in a table for p=i. PMD variable seed_i can be stored in a register accessible to a PMD in accordance with Table 162-7 of IEEE 802.3-2022.

In some examples, a register can store a lane identifier, which controls which polynomial of Table 136-8 of IEEE 802.3-2022 to apply. PMD can read the register to determine what of 4 polynomials of Table 136-8 of IEEE 802.3-2022 to apply. Consistent with IEEE Std. 802.3-2022 Clause 136.8.11, the PRBS generator for each lane can implement each of four defined generator polynomials and the polynomial used in each lane i can be selected by identifier_i. A default identifier for a lane can be its lane number.

A default value of seed_i can be given the value in a table for p=i. At the start of a training pattern, the state of the PRBS generator can be set to a seed value identified in Table 1 and/or Table 136-8. Seeds for polynomials can be stored in at least one register (e.g., IEEE 802.3-2022 clause 45.2.1.168 Table 45-133 (registers 1.1450 to 1.1457)).

TABLE 1

| P | Polynomial_p, G(x) | Default seed bits(a) | Initial output, PAM2(b) | Initial output, PAM4(b) | Initial output, PAM4 with precoding(b) |
|---|---|---|---|---|---|
| 4 | $1 + x + x^2 + x^{12} + x^{13}$ | 1111110100110 | 3030000303303 | 3030001313212 | 3122223012011 |
| 5 | $1 + x^2 + x^3 + x^7 + x^{13}$ | 1100011101110 | 0003030003033 | 0113130013133 | 0103213103212 |
| 6 | $1 + x^2 + x^4 + x^8 + x^{13}$ | 0000001101000 | 3300303000300 | 2300212111300 | 2131102323000 |
| 7 | $1 + x^2 + x^5 + x^9 + x^{13}$ | 0011000100111 | 3333000333030 | 2232000322031 | 2033131202210 |

Specific seeds can be selected to attempt to ensure that the initial PAM4 precoder state is initialized to 0 at the beginning of each training pattern, so that P(j−1)=0 in Equation (135-1) of IEEE Std. 802.3-2022 for the first PAM4 symbol of the training pattern is to be consistent with IEEE Std. 802.3-2022 Clause 136.8.11.1.3 for pre-coded training pattern data.

In some examples, initial seeds can be spaced at approximately half-pattern distance. For example, for PRBS13 of 8192 values, spacing can be approximately 4096 unit intervals (UI) apart. Separation of approximately 4096 UI or approximately 77 nanoseconds is longer than equalizer length (e.g., maximum of 40 UI for IEEE P802.3ck, or 752 picoseconds) but smaller than skew limit of 134 nanoseconds. For example, lane 4 (P=4) default seed is offset 4094 of the original seed of Table 136-8 for P=0. For example, lane 5 (P=5) default seed is offset 4098 of the original seed of Table 136-8 for P=1. For example, lane 6 (P=6) default seed is offset 4086 of the original seed of Table 136-8 for P=2. For example, lane 7 (P=7) default seed is offset 4094 of the original seed of Table 136-8 for P=3. Accordingly, an offset can be small enough to fit within a skew limit and provide a low probability that same bits are being simultaneously or nearly simultaneously transmitted simultaneously on different lanes.

Consistent with IEEE Std. 802.3-2022 Clause 136.8.11, the PRBS generator for each lane can implement each of four generator polynomials defined and the polynomial used For example, to identify lanes 4-7, clause 45.2.1.168 of IEEE Std. 802.3-2022, second paragraph can be re-written as (underline shows additions and strikethrough shows deletions):

For PHYs that use a PRBS13 training pattern, the 13-bit seed value is composed from register bits 15:14 and register bits 10:0, where register bit 0 gives seed bit S0; register bit 1 gives seed bit S1; etc., through register bit 10 gives seed bit S10, register bit 14 gives seed bit S11 and register bit 15 gives seed bit S12. ~~The default PRBS13 seed values are given in Table 136-8.~~ The default identifiers are (binary): for lane 0, 00, for lane 1, 01; for lane2, 10; for lane 3, 11; for lane 4, 00; for lane 5, 01; for lane 6, 10; for lane 7, 11.

Figure 4:
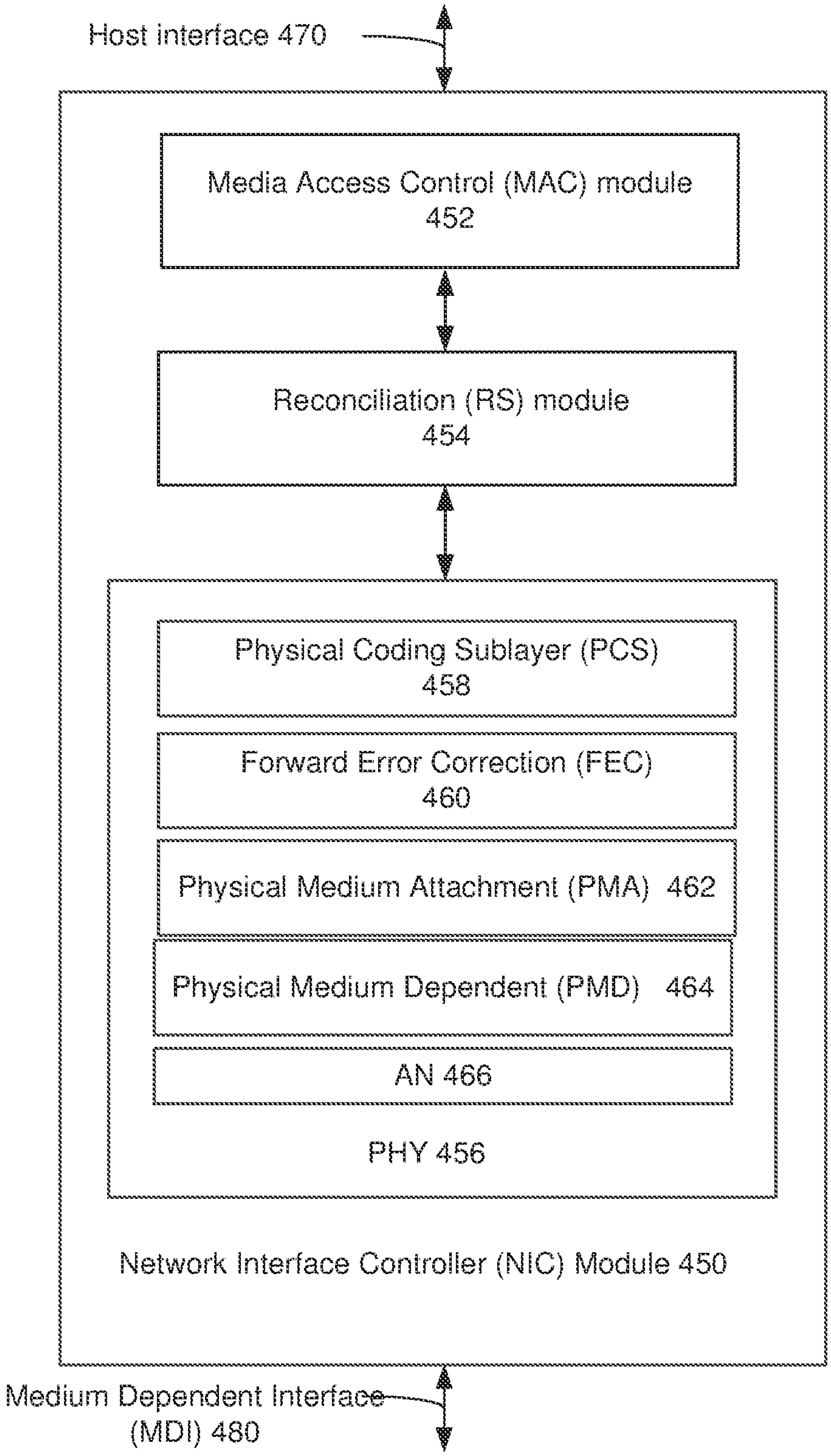
FIG. 4 depicts a system.

FIG. 3 depicts an example training pattern generator, which is a reproduction of Training pattern generator of FIG. 136-4 of 802.3-2022. Other training pattern generators can be used. A transmitter PMD can utilize a training pattern generator per lane to generate a training pattern, that is transmitted to a receiver. The receiver PMD can analyze the training pattern generator. Based on analysis of the training pattern, receiver may request for change to transmitter equalization as described in IEEE 802.3-2022, clause 136.8.11.7.5 and FIG. 136-7 (e.g., starting at SEND_TF to LINK_READY, TIMEOUT send training pattern).

As link partners both include a transmitter and receiver, a link partner can simultaneously train the other partner's transmitter. Link training can enable tuning of the finite impulse response (FIR) filter for a channel in an application-specific integrated circuit (ASIC) or other device to achieve the desired bit error rate (BER), eye size, signal-to-noise ratio (SNR), eye size, or link error rate (e.g., uncorrectable and correctable forward error correction (FEC) errors, pseudorandom bit sequence (PRBS) errors, physical coding sublayer (PCS) errors, and so forth). In some examples, the receiver examines the eye after applying equalization to the signal and determines if eye height and/or eye width is acceptable. The receiver can make a decision to terminate link training because the eye is acceptable, or keep training to optimize the eye further. If the receiver requests that its link partner transmitter change the precursor, main cursor or post-cursor equalization setting, the eye examination process may begin again. After the link is trained, the two devices begin sending normal data traffic using the optimized transmitter settings.

PRBS13 Sequence

In some examples, for 8 lanes of communication, a PMD can include circuitry to generate training signals based on 8 different polynomials using 8 different seed values. In some examples, different PRBS13 polynomials can be used for different lanes of lanes 0-7 so that PRBS13 training sequences based on different polynomials can be practically uncorrelated. Some examples modify IEEE Std. 802.3-2022 Clause 136.8.11 so that: PRBS generator for each lane shall implement each of eight generator polynomials defined; polynomial used in each lane i is selectable by identifier_i; default identifier for each lane is its lane number; at the start of the training pattern, the state of the PRBS generator shall be set to the value seed_i; and default value of seed_i shall be the value given in a table for p=i.

Table 2 depicts an example of polynomials and default seed bits. In some examples, Table 136-8 of IEEE 802.3-2022 can be modified to include the examples for lanes 4-7 in Table 2.

TABLE 2

| P | Polynomial_p, G(x) | Default seed bits(a) | Initial output, PAM2(b) | Initial output, PAM4(b) | Initial output, PAM4 with precoding(b) |
|---|---|---|---|---|---|
| 4 | 1 + X^2 + X^6 + X^10 + X^13 | 1111100100111 | 0303030330330 | 1312131320321 | 1233210331201 |
| 5 | 1 + X^2 + X^7 + X^11 + X^13 | 0001011000001 | 0030333303330 | 1021322212331 | 1332111102123 |
| 6 | 1 + X^2 + X^8 + X^12 + X^13 | 0010010111010 | 0003300000330 | 1113311011230 | 1012101323300 |
| 7 | 1 + X^3 + X^4 + X^8 + X^13 | 1110100000001 | 0003033030300 | 0012033030301 | 0011303122132 |

Note (a): The leftmost bit in the sequence corresponds to the initial value of S0 and the rightmost bit corresponds to the initial value of $12.

Note (b): Transmission order is left to right, top to bottom.

P(4) goes with lane_4, P(5) goes with lane_5, P(6) goes with lane_6, P(7) with lane_7

For example, Clause 45.2.1.168 of IEEE Std. 802.3-2022 can be updated (underline shows additions and strikethrough shows deletions) as follows:

45-133 can be updated to define register 1.1450 bit 13 (and corresponding registers 1.1451-1.1457) to be the highest bit of the polynomial identifier

| Bit(s) | Name | Description | R/W |
|---|---|---|---|
| 1.1450.15:14 | Seed | Two most significant bits of PRBS13 seed | R/W |
| ~~1.1450.13~~ | ~~Reserved~~ | ~~Value always 0~~ | ~~RO~~ |
| 1.1450.~~12~~13:11 | Polynomial identifier | Identifier (0, 1, 2, 3, 4, 5, 6 or 7) selecting polynomial for PRBS | R/W |
| 1.1450.10:0 | Seed | 11 bit, binary seed for sequence | R/W |

FIG. 4 is a block diagram illustrating Ethernet port circuitry in a network interface controller 450. The Ethernet port logic includes a Media Access Control (MAC) module 452, a reconciliation sublayer module 454 and a PHY module 456. The PHY module 456 can include a physical medium attachment (PMA) sublayer module 462, Physical Medium Dependent (PMD) sublayer 464, a forward error correction (FEC) module 460 and a physical coding sublayer (PCS) module 458.

MAC module 452 is configured to transfer data to and from the PHY module 456. The Reconciliation Sublayer (RS) module 454 can provide a mapping operation that reconciles the signals at a Media Independent Interface (MII) to the Media Access Control (MAC)-Physical Signaling Sublayer (PLS) service definitions. MAC module 452 can be configured to implement aspects of the MAC layer operations and the RS module 454 can be configured to implement reconciliation sublayer operations.

The Physical Medium Dependent (PMD) sublayer 464 can be responsible for interfacing to transmission medium, Medium Dependent Interface (MDI) 480. Circuitry of PMD sublayer 464 can select a PRBS pattern and/or seed for generating training signals transmitted on one or more lanes to a receiver, as described herein and based on IEEE 802.3 section 136.8.11. For example, lanes can represent physical or virtual connections between devices. For example, to transmit and receive signals on a lane, one or more of the following media can be used: electrical cabling, optical cabling, a waveguide, wireless signal, or others.

Auto negotiation circuitry (AN) 466 can perform auto negotiation with an end point by sharing a link information on various capabilities relevant to communications. For an example of AN, see Clause 73 of Institute of Electrical and Electronics Engineers (IEEE) 802.3-2022. Link partner devices exchange capabilities and modes of operation via the exchange of base pages and, if requested, the link partner devices exchange next pages to indicate capabilities. According to Clause 73 of IEEE 802.3-2022, a device sends a list of its data-rate and forward error correction (FEC) capabilities to its link partner device. AN can perform capability priority resolution to determine the highest common capability. The highest common capabilities can be used for communication between the link partner devices. After both devices receive their link partner's capability list, the devices can transition to the highest common data rate and feature capabilities.

The Physical Medium Attachment (PMA) sublayer 462 can perform transmission, reception, signal detection, clock recovery and skew alignment. PMD 462 can be configured to transmit and receive serial data over the MDI 480.

In some examples, PMD 464 and PMA 462 can include or use a serializer de-serializer (SerDes). In some examples, PMD 464 can generate training signals using polynomials and/or seed values described herein. In some examples, link training and re-training can be provided to adjust filter parameters of a transmit and/or receive equalizer used by a SerDes. For example, a software SerDes driver executed by a processor in a host or a network interface can be used to change a transmit equalizer parameter. In some examples, any combination of hardware, software and/or firmware can be used to manage and perform link training and/or link re-training.

In some examples (e.g., for 100 GBASE-CRI or 100 GBASE-KR1), FEC module 460 may decode data passed from the PMD 464 and PMA 462 to the PCS module 458 or encode data passed from the PCS module 458 to the PMD 464 and PMA 462. In some examples, (e.g., for 200G and 400G modes), PCS module 458 includes FEC module 460. Forward error correction code may improve the reliability of data transmission at higher line speeds. In the transmit direction, MAC module receives data to be transmitted over a host interface 470.

MAC module 452 can receive data to be transmitted over a host interface 470. MAC module 452 can generate the MAC frame that includes inter-packet gap (IPG), preamble, start of frame delimiter (SFD), padding, and Cyclic Redundancy Check (CRC) bits in addition to the received data before passing the MAC frame to the PHY module 456. The PHY module 456 can encode the MAC frame for reliable serial transmission over the MDI 480.

In the receive direction, MAC module 452 can receive MAC frames over a data bus from PHY module 456. MAC module 452 can perform Ethernet frame detection and validation, cyclic redundancy check (CRC) validation, update statistics counters, strip out the CRC, preamble detection and removal, and start of frame delimiter (SFD) detection and removal, and forward the rest of the MAC frame that includes headers for other protocols to a next layer (for example, an Internet protocol (IP) layer) for processing. The PHY module 456 can decode the MAC frame received over the MDI 480.

Another example system that can use examples described herein in its PMD is described with respect to FIG. 162-1 in IEEE P802.3ck Draft 3.3.

Figure 5A:
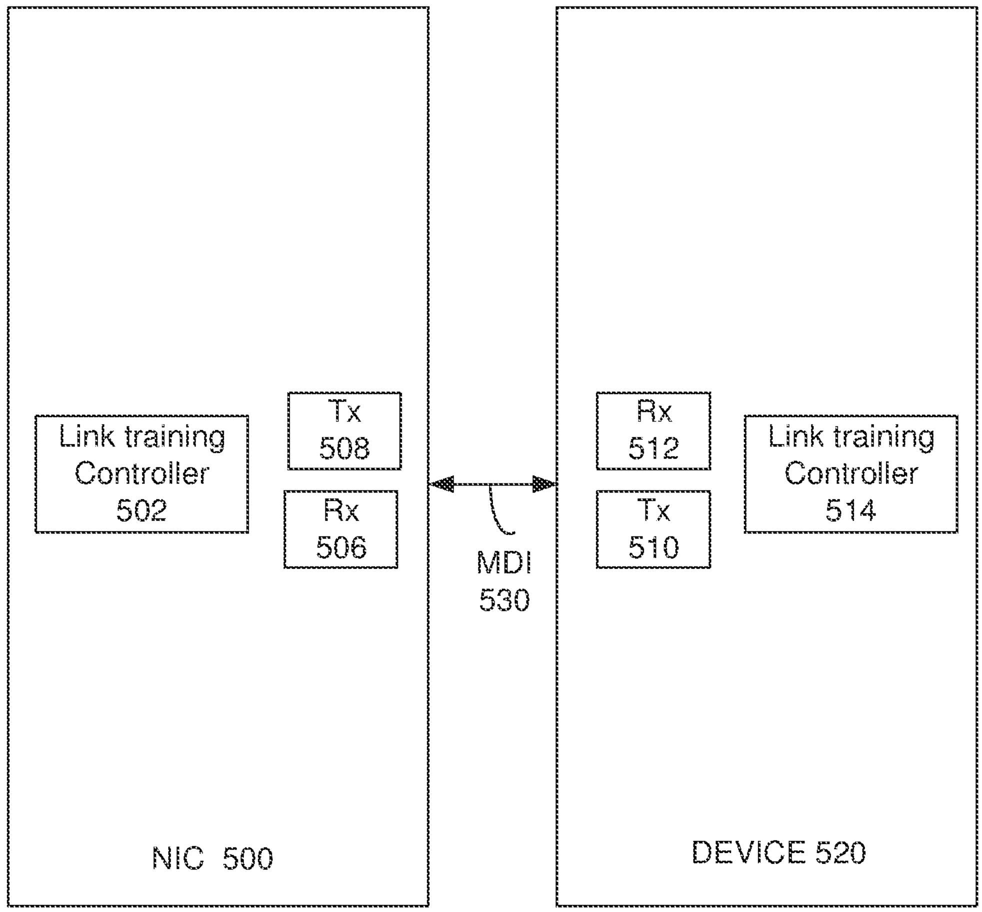
FIG. 5A illustrates a simplified example of a transmitter-receiver pair for between a network interface controller and a device.

FIG. 5A illustrates a simplified example of a transmitter-receiver pair for between a network interface controller 500 and a device 520. MDI 530 provides a link between network interface controller 500 and device 520 by transferring data in parallel over one or more lanes. Device 520 can be any device such as another NIC, a switch, router, a server, a host computing platform, and so forth.

Network interface controller 500 can include a host receiver 506 and a host transmitter 508 for at least one lane of an electrical link between the network interface controller 500 and device 520. Device 520 can include a module receiver 512 and module transmitter 510 for an electrical link between network interface controller 500 and device 520.

For example, link training controller 502 of NIC 500 can initiate or manage link establishment, link training, or link re-training operations as described herein. Link training controller 502 can be implemented as any or a combination of: a driver, microcontroller, or other software in a host or network interface.

Transmitter (Tx) 508/510 or receiver (Rx) 506/512 can use a SerDes to serialize or deserialize a signal. When a SerDes is turned on and a signal is received, Rx tuning can be used to improve the signal quality. When there is a time limit to perform Rx tuning, a signal is to be passed to a PCS layer within the time limit and the link comes-up if the link is acceptable. If the link does not pass, training can be restarted. In some examples, Tx 508-Rx 512 and/or Tx 510-Rx 506 can utilize independent Rx tuning. In some examples, an amount of time to perform equalizer tuning is the same for Tx 508-Rx 512 and Tx 510-Rx 506.

Transmitter (Tx) 508/510 or receiver (Rx) 506/512 can include a PHY to select polynomials and/or seeds for use to generate training signals, as described herein. In some examples, link training controller 502 can cause generation of training signals and link training controller 514 can analyze training signals and cause adjustments of equalizer settings of TX 508 based on the analysis.

When auto-negotiation is used to establish link between two ethernet ports an IEEE defined procedure is followed.

First, a "link codeword base page" exchange can be performed to determine common capabilities and select an operating mode (e.g., link speed (e.g., 1000BASE-KX, 10 GBASE-KX4 . . . 100 GBASE-CR4 and so forth), FEC mode, pause capability, and so forth). Next, a next page exchange phase can occur. The Auto-Negotiation Arbitration state diagram shown in IEEE Std. 802.3-2022 FIG. 73-11. Next page exchange can be used, for example, to advertise IEEE capabilities as well as non-IEEE capabilities such as the Ethernet Consortium modes. At the end of next page exchange, the selected operating mode can be configured and a link-training phase can begin. During this link training phase, changes in the peer transmit (e.g., Tx 508 or Tx 510) equalization settings and monitoring the effect on link quality at the receiver (e.g., Rx 506 or Rx 512) and adjusting equalization settings to optimize the link can occur.

According to various examples, link training controller 502 can attempt to achieve link with another device (e.g., device 520) by use of IEEE 802.3 Clause 73 Auto-Negotiation to determine the highest common speed then use the PMD Control Function (e.g., "link training") protocol to train the receivers for the channel impairments in accordance with various examples described herein. In some examples, link training controller 502 can attempt to achieve link with another device (e.g., device 520) and bypass the IEEE 802.3 Clause 73 Auto-Negotiation protocol and apply the PMD Control Function protocol in accordance with various examples described herein. For example, minimum supported features can be applied between links where capabilities of endpoints are known and connected together to perform synchronization. Capabilities of device can be known to the devices by sharing via a pervasive management agent, a previous link establishment, previously applied AN whereby device capabilities are learned, or other manners. Likewise, link training controller 514 can attempt to achieve link with another device (e.g., NIC 500) in a similar manner as that of link training controller 502.

Communications between devices can occur using any protocol. For example, Ethernet frames can be sent by NIC 500 to device 520. For example, Ethernet frames can be sent by device 520 to NIC 500. An Ethernet frame can include one or more of: a preamble, start of frame delimiter (SFD), destination MAC address, source MAC address, EtherType field, length field, frame check sequence (e.g., cyclic redundancy check (CRC)), and payload.

Figure 5B:
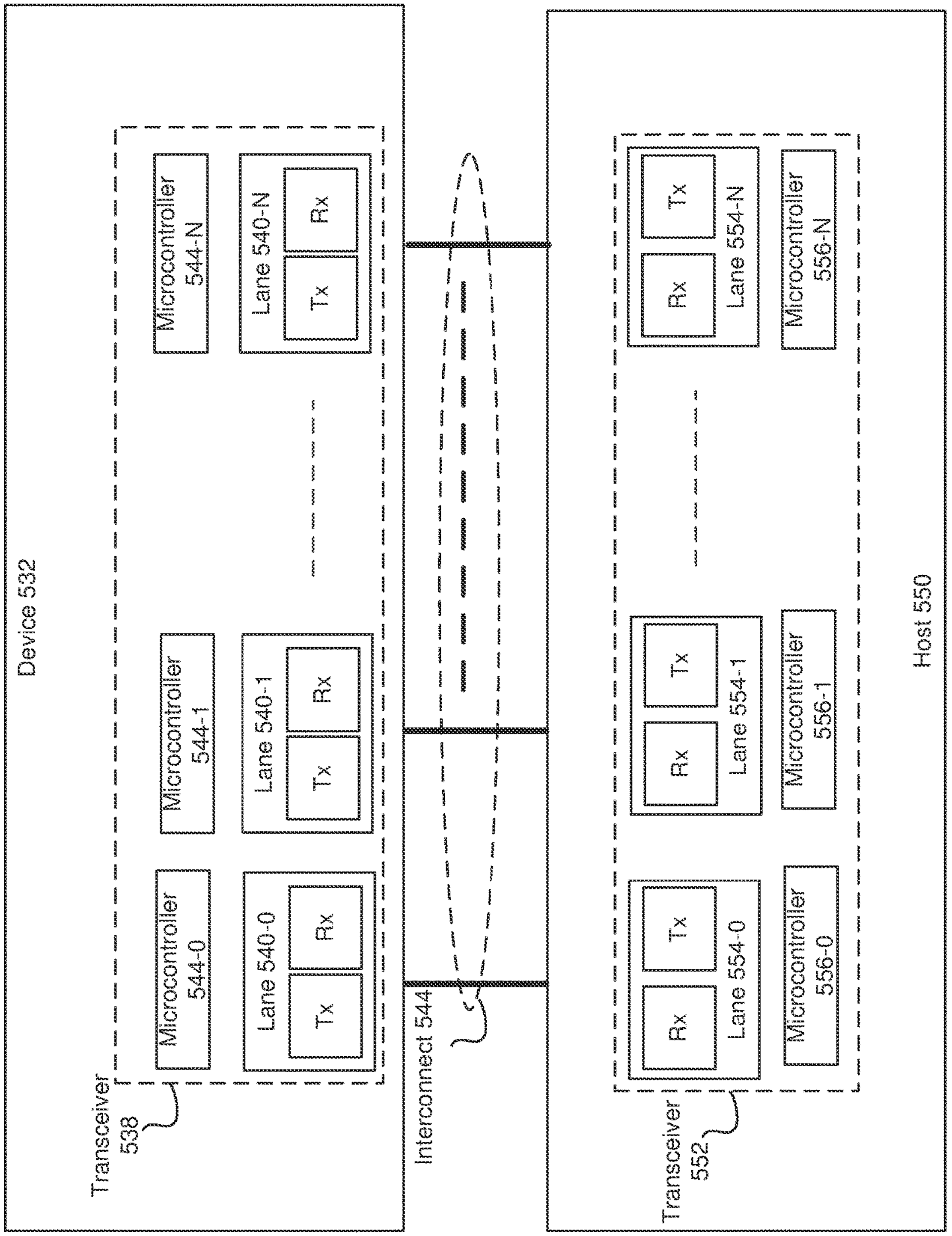
FIG. 5B depicts an example system for communicatively coupling a network device to another network device.

FIG. 5B depicts an example system for communicatively coupling a network device to another network device. For example, host 550 and device 532 can include a network device such as one or more of: a network interface, switch, router, server, host computing platform, interconnect, fabric, rack, or any computing or communications device. For example, device 532 can be connected to an interface with multiple electrical links (e.g., backplane or copper cable). The system provides for multiple lanes of transmit-receive pairs that can be used to transmit or receive electrical signals between host 550 and device 532. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Lanes 554-*x* and 540-*x* could include a PMD to select PRBS polynomial and/or seed for training multiple lanes. Those lanes may or may not be controlled by the microcontroller 544-0 to 544-N and 556-0 to 556-N in which the microcontroller performs or supervises the AN function. Various examples use one or more of microcontrollers 544-0 to 544-N of device 532 to initiate and manage link training of transmitter and/or receiver equalizer settings based on training signals with one or more of microcontrollers 556-0 to 556-N of host 550.

Transceiver 538 can be used for electrical signal transmission and receipt between device 532 and host network interface device 550. Transceiver 538 can provide multiple transmit and receive lanes for electrical signal communication between device 532 and host device 550. For example, lanes 540-0 to 540-N can provide transmit and receive circuitry for coupling with receive and transmit circuitry of lanes 554-0 to 554-N of host device 550. Lanes 540-0 to 540-N can provide serializer/deserializer (SerDes) formatting of signals. In some examples, transceiver 538 can be part of a PMD or PHY.

Device 532 can be communicatively coupled to host device 550 by an interconnect 544. Interconnect 544 can be electrical signal conductors that couple pins or holes of lanes 540-0 to 540-N of a pluggable device 532 to holes or pins of lanes 554-0 to 554-N of host 550. Host network interface device 550 can transmit or receive signals in electrical format to or from device 532.

Host device 550 can include transceiver 552 for communication with device 532. Transceiver 552 can include lanes 554-0 to 554-N where any of lanes 554-0 to 554-N includes receive and transmit circuitry. In some examples, transceiver 552 can be part of a PMD or PHY. Any microcontroller 556-0 to 556-N can be used to manage operation of its lane.

In some examples, a single microcontroller can manage equalizer settings of one or multiple lanes. The one or more parameters can cause a receiver or transmitter device in any of lanes 554-0 to 554-N to adjust its equalizer setting for a specific tap, whether to increase or decrease the coefficient value of an equalizer tap. In some examples, the settings of a tap can be adjusted independent of adjustment of settings of another tap.

In some examples, host 550 can request to change an equalizer setting of any tap of a transmitter equalizer circuit of device 532. Likewise, device 532 can request to change an equalizer setting of any tap of a transmitter equalizer circuit of host 550. Accordingly, device 532 and host 550 can adjust transmitter equalizer settings used by a partner device. Moreover, any of device 532 and host 550 can adjust receiver equalizer settings to compensate for channel distortions.

For example, to initiate an equalizer setting change, any microcontroller 544-0 to 544-N can determine a signal quality of a received signal and determine what transmitter side tap of host device 550 to change and whether to increment or decrement the setting of the tap. For example, an eye opening of a received signal can be measured. An eye can represent 1-to-0 and 0-to-1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically. Similar operations can occur for microcontroller 556-0 to 556-N to adjust transmit equalizer settings of device 532.

Device 532 and/or host 550 can perform packet processing such as one or more of: media access control, any protocol layer processing, security, routing, destination lookup, and so forth.

Figure 6A:
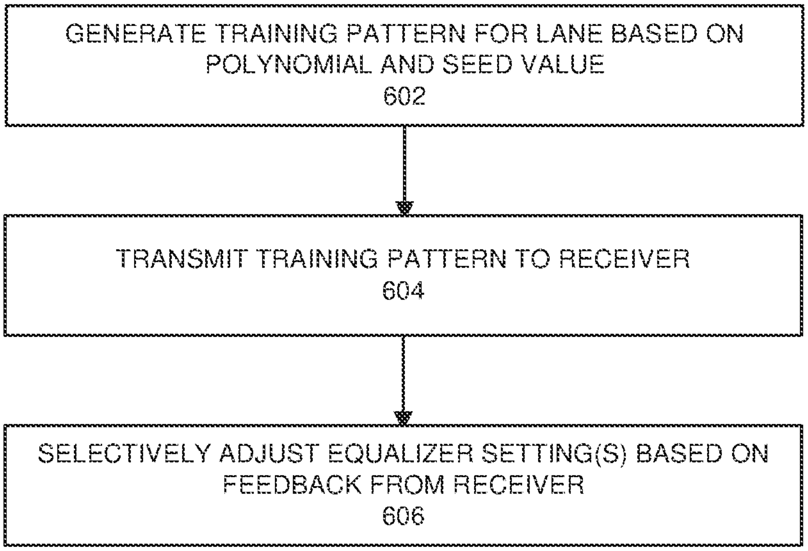
FIG. 6A depicts an example process.

FIG. 6A depicts an example process. The process can be performed by a transmitter during link training of multiple lanes. At 602, a transmitter can generate a training pattern for a lane based on a polynomial and/or seed value. For example, the polynomial and/or seed value can be assigned to a particular lane. For example, a PMD of a transmitter can generate the training pattern. At 604, the transmitter can transmit the training pattern to the receiver. At 606, the transmitter can receive feedback to change an equalizer setting based on analysis by the receiver.

Figure 6B:
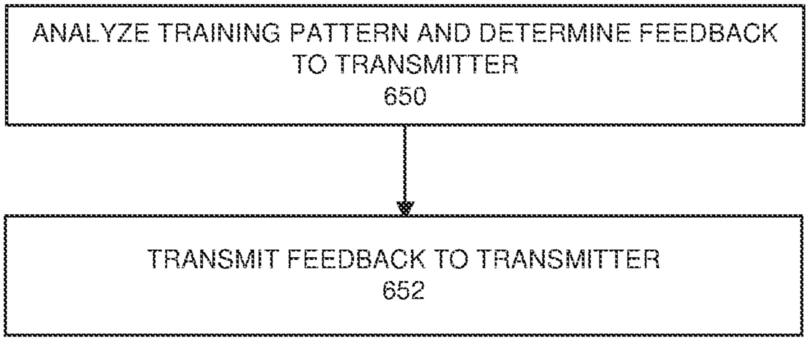
FIG. 6B depicts an example process.

FIG. 6B depicts an example process. The process can be performed by a receiver during link training of multiple lanes. At 650, the receiver can receive a training pattern on a lane and analyze the training pattern. For example, a PMD of the receiver can perform the analysis. In some examples, the receiver can determine one or more of: bit error rate (BER), eye size, signal-to-noise ratio (SNR), eye size, or link error rate (e.g., uncorrectable and correctable forward error correction (FEC) errors, pseudorandom bit sequence (PRBS) errors, physical coding sublayer (PCS) errors, and so forth). At 652, based on the analysis, the receiver can request that its link partner transmitter change one or more of: precursor, main cursor or post-cursor equalization setting.

Figure 7:
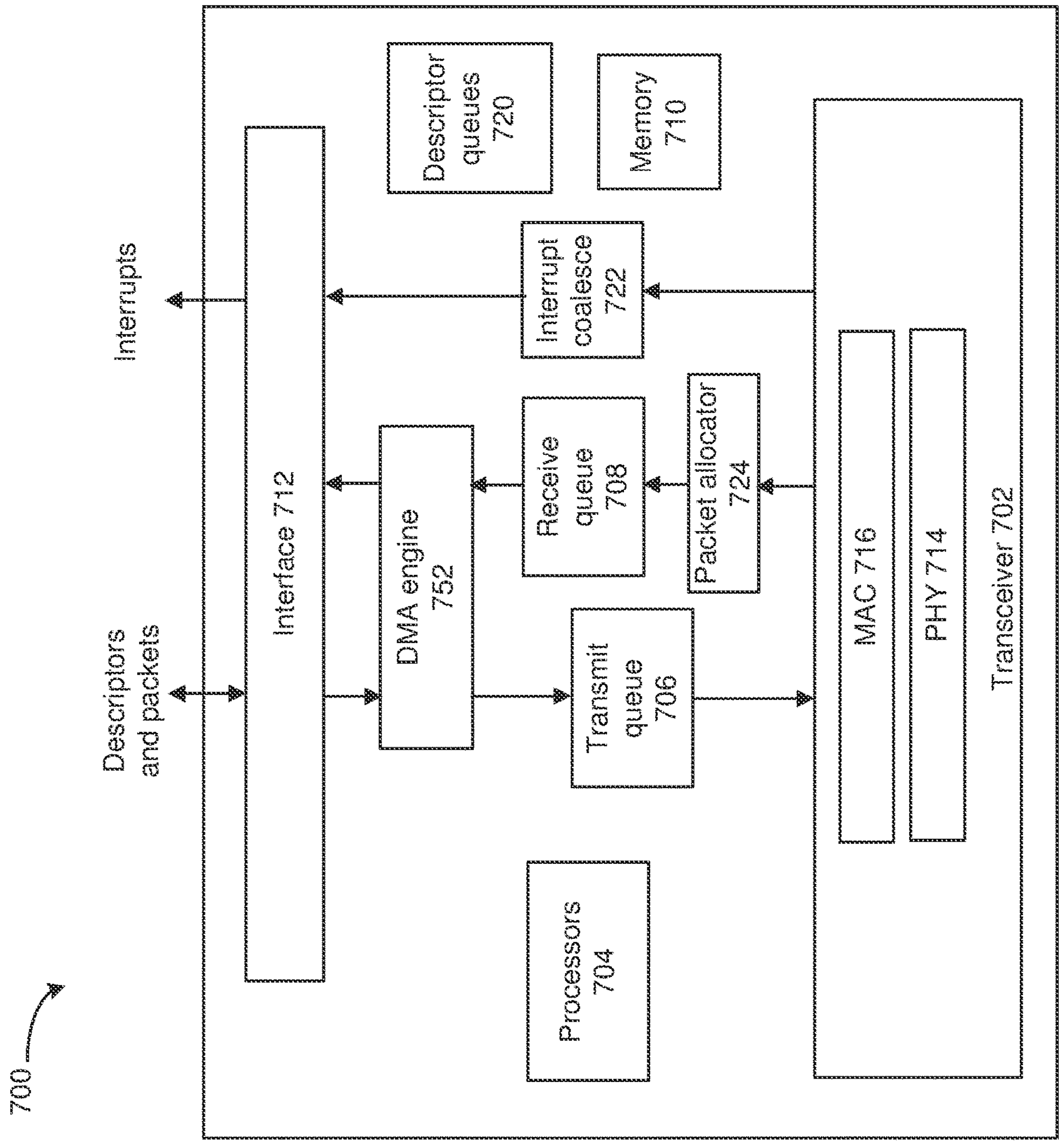
FIG. 7 depicts a network interface.

FIG. 7 depicts an example network interface. Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards.

In some examples, PHY 714 could select PRBS polynomials and/or seeds for use to generate training signals, as described herein. In some examples, PHY 714 can include a PMD to select PRBS polynomial and/or seed for training multiple lanes. Various resources in the network interface can perform link establishment, link training or link re-training in accordance with examples described herein.

MAC circuitry 716 can be configured to assemble data to be transmitted into packets, that include destination and source addresses along with network control information and error detection hash values. Processors 704 can be any a combination of a: processor, core, graphics processing unit (GPU), field programmable gate array (FPGA), application specific integrated circuit (ASIC), or other programmable hardware device that allow programming of network interface 700. For example, processors 704 can provide for identification of a resource to use to perform a workload and generation of a bitstream for execution on the selected resource. For example, a "smart network interface" can provide packet processing capabilities in the network interface using processors 704.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 8:
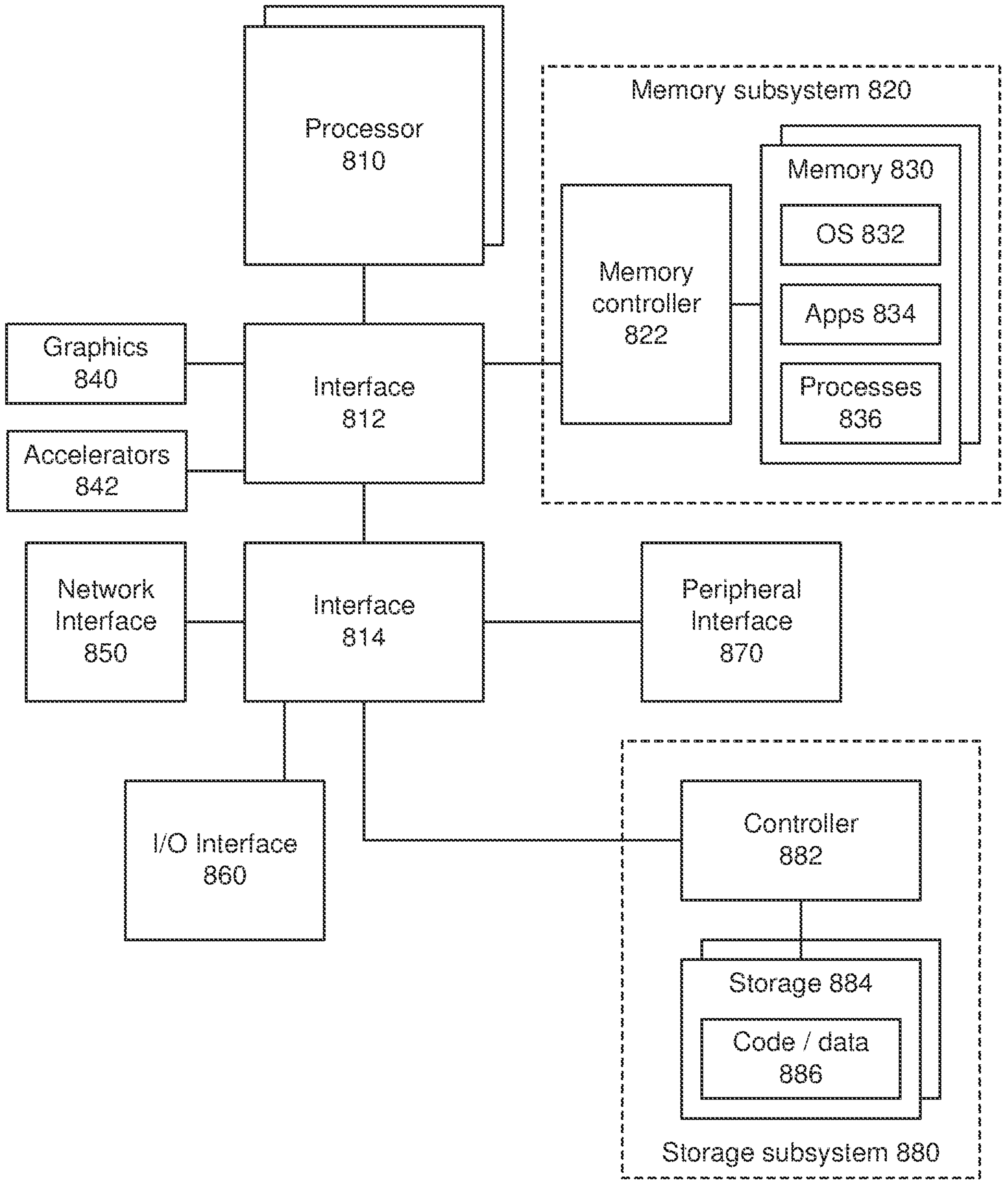
FIG. 8 depicts an example computing system.

FIG. 8 depicts a system. The system can use examples described herein to select PRBS polynomial and/or seed for training multiple lanes, as described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some examples, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as static random-access memory (SRAM), dynamic random-access memory (DRAM), or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, OS 832 or driver for network interface 850 or firmware executed by network interface 850 can enable or disable network interface 850 indicating support for selecting a polynomial and/or seed to generate a training signal for training multiple lanes. In some examples, OS 832 or driver for network interface 850 or firmware executed by network interface 850 can utilize less than a full set of features supported by network interface 850 such as using a strict subset of polynomials and/or seed values, described herein.

In some examples, network interface 850 can be configured by OS 832 or driver to select a polynomial and/or seed to generate a training signal for training multiple lanes. Network interface 850 can advertise capability to select a polynomial and/or seed to generate a training signal for training multiple lanes. In some examples, PMD circuitry of network interface 850 can generate polynomials for the first lane to fourth lane also to generate polynomials for the fifth lane to eighth lane.

In some examples, one or more of processor 810, interface 812, interface 814, graphics 840, network interface 850, accelerators 852, I/O interface 860, memory subsystem 820, peripheral interface 870, storage subsystem 880, or others can access data from lanes trained using the polynomials for the first to eighth lanes, as described herein.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. In some examples, network interface 850 can refer to one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Some examples of network interface 850 can include a programmable packet processing pipeline with one or multiple consecutive stages of match-action circuitry. The programmable packet processing pipeline can be programmed using one or more of: Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), x86 compatible executable binaries or other executable binaries, or others.

Some examples of network interface 850 can include PHY circuitry that can perform AN with one or more link partners to advertise capabilities, discover capabilities, and apply common capabilities, as described herein.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. A non-volatile memory (NVM) device is a memory whose state is determinate even if power is interrupted to the device.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (ROCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network, interconnect, or circuitry that provides chip-to-chip communications, die-to-die communications, packet-based communications, communications over a device interface (e.g., PCIe, CXL, UPI, or others), fabric-based communications, and so forth. A die-to-die communications can be consistent with Embedded Multi-Die Interconnect Bridge (EMIB).

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

For example, link establishment, link training or link re-training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in an example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An example of the devices, systems, and methods may include one or more, and combination of, the examples described below.

Example 1 includes an apparatus comprising: Ethernet physical layer transceiver (PHY) circuitry for use in frame communication with a remote link partner, the Ethernet PHY circuitry comprising: Physical Medium Dependent (PMD) circuitry; and transmitter circuitry and receiver circuitry for use in the frame communication, wherein: the PMD circuitry is to generate a training signal for lane transmission based on a pseudorandom bit sequence (PRBS) polynomial and seed, a number of lanes to be trained is more than four, to control crosstalk among different lanes, the PMD circuitry is to generate the training signal for transmission for a lane based on a PRBS polynomial and seed comprises: for a first lane, generate a polynomial, G(x), based on $1+x+x^2+x^{12}+x^{13}$, for a second lane, generate a polynomial, G(x), based on $1+x^2+x^3+x^7+x^{13}$, for a third lane, generate a polynomial, G(x), based on $1+x^2+x++x^8+x^{13}$, for a fourth lane, generate a polynomial, G(x), based on $1+x^2+x^5+x^9+x^{13}$, for a fifth lane, generate a polynomial, G(x), based on $1+x+x^2+x^{12}+x^{13}$, for a sixth lane, generate a polynomial, G(x), based on $1+x^2+x^3+x^7+x^{13}$, for a seventh lane, generate a polynomial, G(x), based on $1+x^2+x++x^8+x^{13}$, for an eighth lane, generate a polynomial, G(x), based on $1+x^2+x^5+x^9+x^{13}$, for the fifth lane, default seed bits(a) comprises 1111110100110, for the sixth lane, default seed bits(a) comprises 1100011101110, for the seventh lane, default seed bits(a) comprises 0000001101000, for the eighth lane, default seed bits(a) comprises 0011000100111, for the fifth lane, an initial output for PAM2(b) comprises 3030000303303, for the sixth lane, an initial output for PAM2(b) comprises 0003030003033, for the seventh lane, an initial output for PAM2(b) comprises 3300303000300, for the eighth lane, an initial output for PAM2(b) comprises 3333000333030, for the fifth lane, an initial output for PAM4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

Example 2 includes one or more examples, wherein: for the fifth lane: Initial output, PAM4 with precoding(b) comprises: 3122223012011, for the sixth lane: Initial output, PAM4 with precoding(b) comprises: 0103213103212, for the seventh lane: Initial output, PAM4 with precoding(b) comprises: 2131102323000, and for the eighth lane: Initial output, PAM4 with precoding(b) comprises: 2033131202210.

Example 3 includes one or more examples, wherein: to generate the training signal for transmission for a lane based on a PRBS polynomial and seed comprises: access an identifier in a register to identify a polynomial to utilize, wherein: a polynomial identifier for the fifth lane comprises 00, a polynomial identifier for the sixth lane comprises 01, a polynomial identifier for the seventh lane comprises 10, and a polynomial identifier for the eighth lane comprises 11.

Example 4 includes one or more examples, wherein: to generate the training signal for transmission for a lane based on a PRBS polynomial and seed comprises access the seed from a register based on a lane identifier value.

Example 5 includes one or more examples, wherein: to generate the training signal for transmission for a lane based on a PRBS polynomial and seed comprises access the seed from a register based on a lane identifier value is based on a configuration and the configuration is to specify use or non-use of a seed value for at least one lane among the fifth through eighth lanes that is different from a seed value for lanes 0-3.

Example 6 includes one or more examples, wherein: the configuration is provided by one or more of: an operating system (OS), network interface driver, or firmware.

Example 7 includes one or more examples, wherein the PMD circuitry is to utilize circuitry to perform circuitry to generate polynomials for the first lane to fourth lane also to generate polynomials for the fifth lane to eighth lane.

Example 8 includes one or more examples, and includes media access control (MAC) circuitry coupled to the PMD circuitry, wherein the MAC circuitry is to access data from lanes trained using the polynomials for the first to eighth lanes.

Example 9 includes one or more examples, and includes a server system to access data from lanes trained using the polynomials for the first to eighth lanes.

Example 10 includes one or more examples, wherein the server system comprises circuitry to access data from lanes trained using the polynomials for the first to eighth lanes and wherein the circuitry to access data from lanes trained using the polynomials for the first to eighth lanes comprises one or more of: a device interface, a processor core, an accelerator, a memory, or storage.

Example 11 includes one or more examples, and includes at least one non-transitory computer readable medium comprising instructions stored thereon, that if executed by at least one processor, cause the at least one processor to: execute an operating system (OS) to: configure Ethernet physical layer transceiver (PHY) circuitry to generate a training signal for transmission for a lane based on a pseudorandom bit sequence (PRBS) polynomial and seed, wherein: a number of lanes to be trained is more than four, to generate the training signal for transmission for a lane based on a PRBS polynomial and seed comprises: for a first lane, generate a polynomial, G(x), based on $1+x+x^2+x^{12}+x^{13}$, for a second lane, generate a polynomial, G(x), based on $1+x^2+x^3+x^7+x^{13}$, for a third lane, generate a polynomial, G(x), based on $1+x^2+x++x^8+x^{13}$, for a fourth lane, generate a polynomial, G(x), based on $1+x^2+x^5+x^9+x^{13}$, for a fifth lane, generate a polynomial, G(x), based on $1+x+x^2+x^{12}+x^{13}$, for a sixth lane, generate a polynomial, G(x), based on $1+x^2+x^3+x^7+x^{13}$, for a seventh lane, generate a polynomial, G(x), based on $1+x^2+x++x^8+x^{13}$, and for an eighth lane, generate a polynomial, G(x), based on $1+x^2+x^5+x^9+x^{13}$.

Example 12 includes one or more examples, wherein: for the fifth lane, default seed bits(a) comprises 1111110100110, for the sixth lane, default seed bits(a) comprises 1100011101110, for the seventh lane, default seed bits(a) comprises 0000001101000, and for the eighth lane, default seed bits(a) comprises 0011000100111.

Example 13 includes one or more examples, wherein: for the fifth lane, an initial output for PAM2(b) comprises 3030000303303, for the sixth lane, an initial output for PAM2(b) comprises 0003030003033, for the seventh lane, an initial output for PAM2(b) comprises 3300303000300, and for the eighth lane, an initial output for PAM2(b) comprises 3333000333030.

Example 14 includes one or more examples, wherein: for the fifth lane, an initial output for PAM4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

Example 15 includes one or more examples, wherein: for the fifth lane: Initial output, PAM4 with precoding(b) comprises: 3122223012011, for the sixth lane: Initial output, PAM4 with precoding(b) comprises: 0103213103212, for the seventh lane: Initial output, PAM4 with precoding(b) comprises: 2131102323000, and for the eighth lane: Initial output, PAM4 with precoding(b) comprises: 2033131202210.

Example 16 includes one or more examples, wherein to generate the training signal for transmission for a lane based on a PRBS polynomial and seed comprises: access an identifier in a register to identify a polynomial to utilize, wherein: a polynomial identifier for the fifth lane comprises 00, a polynomial identifier for the sixth lane comprises 01, a polynomial identifier for the seventh lane comprises 10, and a polynomial identifier for the eighth lane comprises 11.

Example 17 includes one or more examples, wherein: to generate the training signal for transmission for a lane based on a PRBS polynomial and seed comprises access the seed from a register based on a lane identifier value is based on a configuration and the configuration is to specify use or non-use of a seed value for at least one lane among the fifth through eighth lanes that is different from a seed value for the first through fourth lanes.

Example 18 includes one or more examples, and includes a method comprising: during training of link partners, generating a training signal for transmission for a lane based on a pseudorandom bit sequence (PRBS) polynomial and seed, wherein: a number of lanes to be trained is more than four, to generate the training signal for transmission for a lane based on a PRBS polynomial and seed comprises: for a first lane, generating a polynomial, G(x), based on $1+x+x^2+x^{12}+x^{13}$, for a second lane, generating a polynomial, G(x), based on $1+x^2+x^3+x^7+x^{13}$, for a third lane, generating a polynomial, G(x), based on $1+x^2+x++x^8+x^{13}$, for a fourth lane, generating a polynomial, G(x), based on $1+x^2+x^5+x^9+x^{13}$, for a fifth lane, generating a polynomial, G(x), based on $1+x+x^2+x^{12}+x^{13}$, for a sixth lane, generating a polynomial, G(x), based on $1+x^2+x^3+x^7+x^{13}$, for a seventh lane, generating a polynomial, G(x), based on $1+x^2+x++x^8+x^{13}$, and for an eighth lane, generating a polynomial, G(x), based on $1+x^2+x^5+x^9+x^{13}$.

Example 19 includes one or more examples, wherein: for the fifth lane, default seed bits(a) comprises 1111110100110, for the sixth lane, default seed bits(a) comprises 1100011101110, for the seventh lane, default seed bits(a) comprises 0000001101000, and for the eighth lane, default seed bits(a) comprises 0011000100111.

Example 20 includes one or more examples, wherein: for the fifth lane, an initial output for PAM2(b) comprises 3030000303303, for the sixth lane, an initial output for PAM2(b) comprises 0003030003033, for the seventh lane, an initial output for PAM2(b) comprises 3300303000300, and for the eighth lane, an initial output for PAM2(b) comprises 3333000333030.

Example 21 includes one or more examples, wherein: for the fifth lane, an initial output for PAM4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

Example 22 includes one or more examples, wherein: for the fifth lane: Initial output, PAM4 with precoding(b) comprises: 3122223012011, for the sixth lane: Initial output, PAM4 with precoding(b) comprises: 0103213103212, for the seventh lane: Initial output, PAM4 with precoding(b) comprises: 2131102323000, and for the eighth lane: Initial output, PAM4 with precoding(b) comprises: 2033131202210.

The invention claimed is:

1. An apparatus comprising:

Ethernet physical layer transceiver (PHY) circuitry for use in frame communication with a remote link partner, the Ethernet PHY circuitry comprising:

Physical Medium Dependent (PMD) circuitry; and transmitter circuitry and receiver circuitry for use in the frame communication, wherein:

the PMD circuitry is to generate a training signal for lane transmission based on a pseudorandom bit sequence (PRBS) polynomial and seed, a number of lanes to be trained is more than four, to control crosstalk among different lanes, the PMD circuitry is to generate the training signal for transmission for a lane based on a PRBS polynomial and seed comprises:

for a first lane, generate a polynomial, G(x), based on $1+x+x^2+x^{12}+x^{13}$, for a second lane, generate a polynomial, G(x), based on $1+x^2+x^3+x^7+x^{13}$, for a third lane, generate a polynomial, G(x), based on $1+x^2+x^4+x^8+x^{13}$, for a fourth lane, generate a polynomial, G(x), based on $1+x^2+x^5+x^9+x^{13}$, for a fifth lane, generate a polynomial, G(x), based on $1+x+x^2+x^{12}+x^{13}$, for a sixth lane, generate a polynomial, G(x), based on $1+x^2+x^3+x^7+x^{13}$, for a seventh lane, generate a polynomial, G(x), based on $1+x^2+x^4+x^8+x^{13}$, for an eighth lane, generate a polynomial, G(x), based on $1+x^2+x^5+x^9+x^{13}$, for the fifth lane, default seed bits (a) comprises 1111110100110, for the sixth lane, default seed bits (a) comprises 1100011101110, for the seventh lane, default seed bits (a) comprises 0000001101000, for the eighth lane, default seed bits (a) comprises 0011000100111, for the fifth lane, an initial output for pulse amplitude modulation (PAM)2(b) comprises 3030000303303, for the sixth lane, an initial output for PAM2(b) comprises 0003030003033, for the seventh lane, an initial output for PAM2(b) comprises 3300303000300, for the eighth lane, an initial output for PAM2(b) comprises 3333000333030, for the fifth lane, an initial output for PAM4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

2. The apparatus of claim 1, wherein:

for the fifth lane: Initial output, PAM4 with precoding(b) comprises: 3122223012011, for the sixth lane: Initial output, PAM4 with precoding(b) comprises: 0103213103212, for the seventh lane: Initial output, PAM4 with precoding (b) comprises: 2131102323000, and for the eighth lane: Initial output, PAM4 with precoding (b) comprises: 2033131202210.

3. The apparatus of claim 1, wherein to generate the training signal for transmission for a lane based on a PRBS polynomial and seed comprises:

access an identifier in a register to identify a polynomial to utilize, wherein:

a polynomial identifier for the fifth lane comprises 00, a polynomial identifier for the sixth lane comprises 01, a polynomial identifier for the seventh lane comprises 10, and a polynomial identifier for the eighth lane comprises 11.

4. The apparatus of claim 1, wherein to generate the training signal for transmission for a lane based on a PRBS polynomial and seed comprises access the seed from a register based on a lane identifier value.

5. The apparatus of claim 1, wherein:

to generate the training signal for transmission for a lane based on a PRBS polynomial and seed comprises access the seed from a register based on a lane identifier value is based on a configuration and the configuration is to specify use or non-use of a seed value for at least one lane among the fifth through eighth lanes that is different from a seed value for lanes 0-3.

6. The apparatus of claim 5, wherein:

the configuration is provided by one or more of: an operating system (OS), network interface driver, or firmware.

7. The apparatus of claim 1, wherein the PMD circuitry is to utilize circuitry to perform circuitry to generate polynomials for the first lane to fourth lane also to generate polynomials for the fifth lane to eighth lane.

8. The apparatus of claim 1, comprising:

media access control (MAC) circuitry coupled to the PMD circuitry, wherein the MAC circuitry is to access data from lanes trained using the polynomials for the first to eighth lanes.

9. The apparatus of claim 1, comprising:

a server system to access data from lanes trained using the polynomials for the first to eighth lanes.

10. The apparatus of claim 9, wherein the server system comprises circuitry to access data from lanes trained using the polynomials for the first to eighth lanes and wherein the circuitry to access data from lanes trained using the polynomials for the first to eighth lanes comprises one or more of: a device interface, a processor core, an accelerator, a memory, or storage.

11. At least one non-transitory computer readable medium comprising instructions stored thereon, that if executed by at least one processor, cause the at least one processor to:

execute an operating system (OS) to:

configure Ethernet physical layer transceiver (PHY) circuitry to generate a training signal for transmission for a lane based on a pseudorandom bit sequence (PRBS) polynomial and seed, wherein:

a number of lanes to be trained is more than four, to generate the training signal for transmission for a lane based on a PRBS polynomial and seed comprises:

for a first lane, generate a polynomial, G(x), based on $1+x+x^2+x^{12}+x^{13}$, for a second lane, generate a polynomial, G(x), based on $1+x^2+x^3+x^7+x^{13}$, for a third lane, generate a polynomial, G(x), based on $1+x^2+x^4+x^8+x^{13}$, for a fourth lane, generate a polynomial, G(x), based on $1+x^2+x^5+x^9+x^{13}$, for a fifth lane, generate a polynomial, G(x), based on $1+x+x^2+x^{12}+x^{13}$, for a sixth lane, generate a polynomial, G(x), based on $1+x^2+x^3+x^7+x^{13}$, for a seventh lane, generate a polynomial, G(x), based on $1+x^2+x^4+x^8+x^{13}$, and for an eighth lane, generate a polynomial, G(x), based on $1+x^2+x^5+x^9+x^{13}$.

12. The non-transitory computer readable medium of claim 11, wherein:

for the fifth lane, default seed bits (a) comprises 1111110100110, for the sixth lane, default seed bits (a) comprises 1100011101110, for the seventh lane, default seed bits (a) comprises 0000001101000, and for the eighth lane, default seed bits (a) comprises 0011000100111.

13. The non-transitory computer readable medium of claim 11, wherein:

for the fifth lane, an initial output for pulse amplitude modulation (PAM)2(b) comprises 3030000303303, for the sixth lane, an initial output for PAM2(b) comprises 0003030003033, for the seventh lane, an initial output for PAM2(b) comprises 3300303000300, and for the eighth lane, an initial output for PAM2(b) comprises 3333000333030.

14. The non-transitory computer readable medium of claim 11, wherein:

for the fifth lane, an initial output for pulse amplitude modulation (PAM)4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

15. The non-transitory computer readable medium of claim 11, wherein:

for the fifth lane: Initial output, pulse amplitude modulation (PAM)4 with precoding(b) comprises: 3122223012011, for the sixth lane: Initial output, PAM4 with precoding(b) comprises: 0103213103212, for the seventh lane: Initial output, PAM4 with precoding (b) comprises: 2131102323000, and for the eighth lane: Initial output, PAM4 with precoding (b) comprises: 2033131202210.

16. The non-transitory computer readable medium of claim 11, wherein to generate the training signal for transmission for a lane based on a PRBS polynomial and seed comprises:

access an identifier in a register to identify a polynomial to utilize, wherein:

a polynomial identifier for the fifth lane comprises 00, a polynomial identifier for the sixth lane comprises 01, a polynomial identifier for the seventh lane comprises 10, and a polynomial identifier for the eighth lane comprises 11.

17. The non-transitory computer readable medium of claim 11, wherein:

to generate the training signal for transmission for a lane based on a PRBS polynomial and seed comprises access the seed from a register based on a lane identifier value is based on a configuration and the configuration is to specify use or non-use of a seed value for at least one lane among the fifth through eighth lanes that is different from a seed value for the first through fourth lanes.

18. A method comprising:

during training of link partners, generating a training signal for transmission for a lane based on a pseudorandom bit sequence (PRBS) polynomial and seed, wherein:

a number of lanes to be trained is more than four, to generate the training signal for transmission for a lane based on a PRBS polynomial and seed comprises:

for a first lane, generating a polynomial, G(x), based on $1+x+x^2+x^{12}+x^{13}$, for a second lane, generating a polynomial, G(x), based on $1+x^2+x^3+x^7+x^{13}$, for a third lane, generating a polynomial, G(x), based on $1+x^2+x^4+x^8+x^{13}$, for a fourth lane, generating a polynomial, G(x), based on $1+x^2+x^5+x^9+x^{13}$, for a fifth lane, generating a polynomial, G(x), based on $1+x+x^2+x^{12}+x^{13}$, for a sixth lane, generating a polynomial, G(x), based on $1+x^2+x^3+x^7+x^{13}$, for a seventh lane, generating a polynomial, G(x), based on $1+x^2+x^4+x^8+x^{13}$, and for an eighth lane, generating a polynomial, G(x), based on $1+x^2+x^5+x^9+x^{13}$.

19. The method of claim 18, wherein:

for the fifth lane, default seed bits (a) comprises 1111110100110, for the sixth lane, default seed bits (a) comprises 1100011101110, for the seventh lane, default seed bits (a) comprises 0000001101000, and for the eighth lane, default seed bits (a) comprises 0011000100111.

20. The method of claim 18, wherein:

for the fifth lane, an initial output for pulse amplitude modulation (PAM)2(b) comprises 3030000303303, for the sixth lane, an initial output for PAM2(b) comprises 0003030003033, for the seventh lane, an initial output for PAM2(b) comprises 3300303000300, and for the eighth lane, an initial output for PAM2(b) comprises 3333000333030.

21. The method of claim 18, wherein:

for the fifth lane, an initial output for pulse amplitude modulation (PAM)4(b) comprises 3030001313212, for the sixth lane, an initial output for PAM4(b) comprises 0113130013133, for the seventh lane, an initial output for PAM4(b) comprises 2300212111300, and for the eighth lane, an initial output for PAM4(b) comprises 2232000322031.

22. The method of claim 18, wherein:

for the fifth lane: Initial output, pulse amplitude modulation (PAM)4 with precoding(b) comprises: 3122223012011, for the sixth lane: Initial output, PAM4 with precoding(b) comprises: 0103213103212, for the seventh lane: Initial output, PAM4 with precoding (b) comprises: 2131102323000, and for the eighth lane: Initial output, PAM4 with precoding (b) comprises: 2033131202210.

* * * * *